(12) United States Patent
Howard et al.

(10) Patent No.: US 8,041,499 B2
(45) Date of Patent: Oct. 18, 2011

(54) METHOD AND APPARATUS FOR COMBUSTION CHAMBER PRESSURE ESTIMATION

(75) Inventors: Miles Howard, Coventry (GB); Michaela Walford, Coventry (GB)

(73) Assignee: Denso Corporation, Kariya (JP)

( * ) Notice: Subject to any disclaimer, the term of this patent is extended or adjusted under 35 U.S.C. 154(b) by 332 days.

(21) Appl. No.: 12/415,496

(22) Filed: Mar. 31, 2009

(65) Prior Publication Data

US 2010/0250093 A1   Sep. 30, 2010

(51) Int. Cl.
*F02M 51/00* (2006.01)
*F02M 7/00* (2006.01)
(52) U.S. Cl. .................... 701/103; 123/435
(58) Field of Classification Search .......... 123/435, 123/434, 480, 494, 1 A; 701/103, 104, 102; 73/114.41; 703/7, 8; 137/482
See application file for complete search history.

(56) References Cited

U.S. PATENT DOCUMENTS

| 2003/0188571 A1* | 10/2003 | Wright ........................... 73/115 |
| 2008/0183372 A1* | 7/2008 | Snyder ........................ 701/105 |
| 2009/0159046 A1* | 6/2009 | Moriya ........................ 123/435 |
| 2009/0248282 A1* | 10/2009 | Adachi ........................ 701/112 |

FOREIGN PATENT DOCUMENTS

| JP | 2007 32531 | 2/2007 |
| WO | WO 2007/013663 | 2/2007 |

* cited by examiner

*Primary Examiner* — Mahmoud Gimie
(74) *Attorney, Agent, or Firm* — Nixon & Vanderhye P.C.

(57) ABSTRACT

In order to compensate for pressure drop across a fuel injector, pressure in a combustion chamber of an internal combustion engine into which fuel is injected is estimated based on manifold pressure at a timing for intake valve closure and volumes of the combustion chamber at a timing for intake valve closure and at least one other timing.

17 Claims, 5 Drawing Sheets

METHOD AND APPARATUS FOR COMBUSTION CHAMBER PRESSURE ESTIMATION

BACKGROUND

1. Technical Field

Example embodiments of the present invention relate to a method and apparatus for cylinder pressure estimation in an engine management system for an internal combustion engine.

2. Related Art

An engine management system for an internal combustion engine controls many parameters of engine operation.

In order to achieve efficient low emission combustion, a modern engine management system controls fuel injectors to inject a target mass of fuel for each combustion. The fuel flow through an injector is a function of a pressure drop across the injector between a fuel supply line and the interior of the combustion chamber in which the combustion is to take place. The desired fuel mass is typically performed based on the pressure of the fuel in the supply line and width of a pulse controlling the time that the injector is open to release fuel into the combustion chamber.

To achieve the target fuel mass, the width of the injector pulse needs to be compensated for a pressure drop across the injector. For example, in a direct injection engine, the injector pressure drop corresponds to the fuel line, or fuel rail, pressure minus the pressure in the combustion chamber (for example, in the combustion chamber of the cylinder). However, during compression injection, the pressure drop across the injector varies because of changing cylinder pressure due to movement of the piston within the cylinder and the injection of the fuel.

Due to the adverse environment with a combustion chamber, it is not currently economically practical to accurately measure the pressure within the combustion chamber. Accordingly, an example embodiment of the invention seeks to provide an estimation of the pressure within the combustion chamber during at least part of a combustion cycle, to enable more accurate compensation for the differential pressure across the injector.

SUMMARY

An example embodiment of the invention can provide a method of estimating a pressure in a combustion chamber of an internal combustion engine into which fuel is injected by a fuel injector, the method comprising estimating the pressure based on manifold pressure at a timing for intake valve closure and volumes of the combustion chamber at a timing for intake valve closure and at least one other timing.

In one example of the method, an average pressure in the combustion chamber over a period the injector is open can be computed using estimated pressures computed based on manifold pressure at a timing for intake valve closure and volumes of the combustion chamber at the timing for intake valve closure and at least multiple other timings and then averaging the estimated pressures over the period of the injector opening.

Another example embodiment of the invention can provide a method of adjusting an injection pulse width during which a fuel injector is open for injecting fuel into a combustion chamber of an internal combustion engine, the method comprising applying a pressure compensation to a fuel supply pressure based on an estimated combustion chamber pressure, the estimated combustion chamber pressure being computed based on a manifold pressure at a timing for intake valve closure and volumes of the combustion chamber at the timing for intake valve closure and at least one other timing.

Another example embodiment of the invention can provide an engine control unit comprising pressure estimating logic operable to estimate pressure in a combustion chamber of a cylinder of an internal combustion engine into which fuel is injected, the method of pressure estimating logic being operable to estimate the pressure based on manifold pressure at a timing for intake valve closure and volumes of the combustion chamber at the timing for intake valve closure and at least one other timing.

Another example embodiment of the invention can provide an internal combustion engine system comprising an internal combustion engine having at least one combustion chamber and such an engine control unit.

In another example embodiment of the invention, the method can be implemented using a computer readable storage medium tangibly storing computer readable program code which, upon execution by a computer, enables the computer to perform any of the above described example methods of the present invention.

BRIEF DESCRIPTION OF THE DRAWINGS

Example embodiments of the present invention will now be described by way of example only with reference to the accompanying drawings. In the accompanying drawings.

DETAILED DESCRIPTION OF EXAMPLE EMBODIMENTS

An example embodiment of the present invention is described hereinafter that enables compensation for the differential pressure across a fuel injector of an internal combustion engine, wherein pressure in a combustion chamber of the internal combustion engine into which fuel is injected is estimated based on manifold pressure at a timing for intake valve closure and volumes of the combustion chamber at the timing for intake valve closure and at least one other timing.

Figure 1:
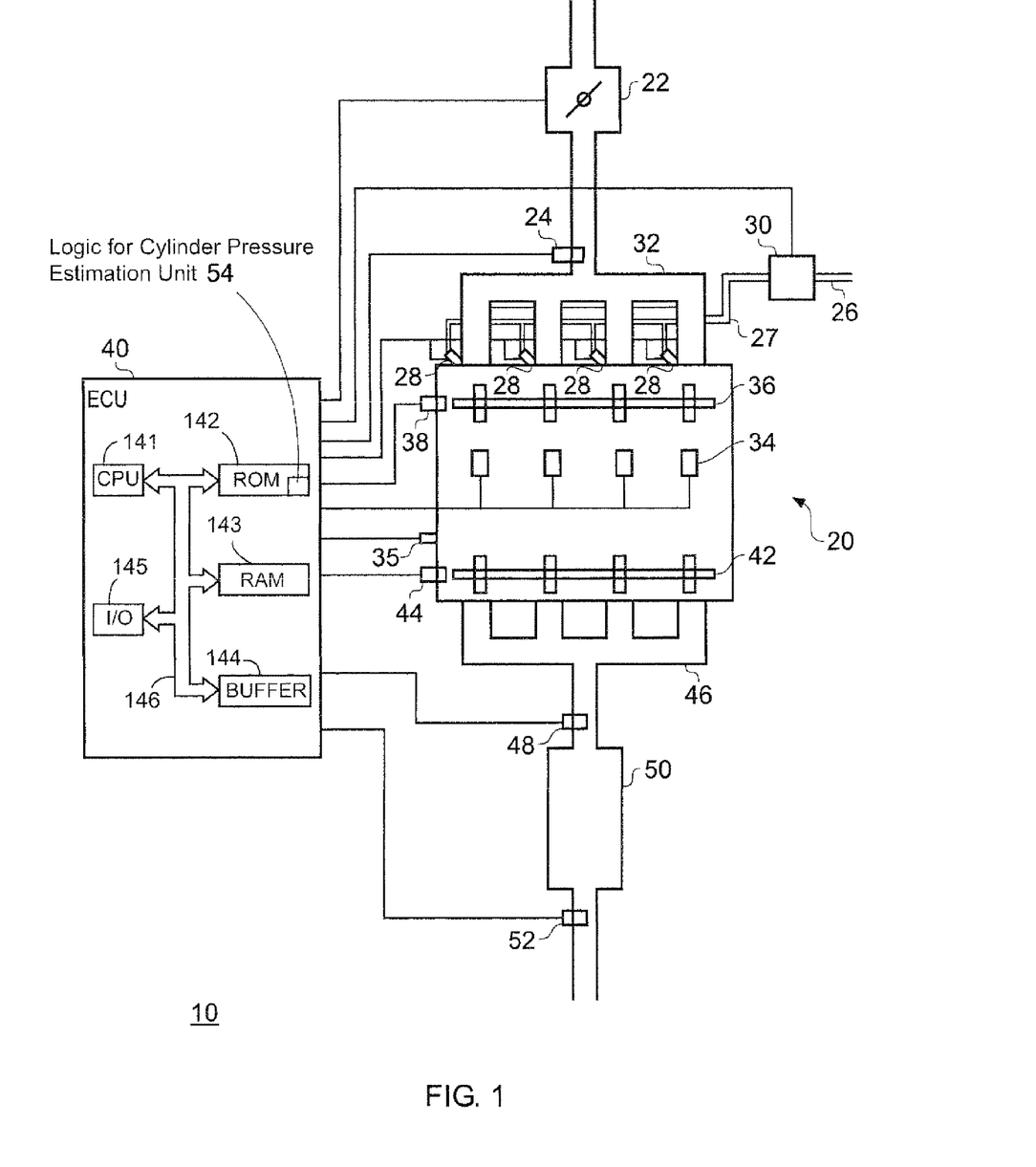
FIG. 1 is a schematic representation of an example of an internal combustion engine according to an example embodiment of the present invention.

FIG. 1 provides a schematic overview of an engine system 10 including an internal combustion engine 20. The internal combustion engine 20 represented in FIG. 1 is a four cylinder gasoline engine. The engine system is controlled by an engine management system that includes an engine control unit (ECU) 40 and various sensors and control subsystems of the engine system 10 to which the ECU is connected. An electronic control unit (ECU) 40 may include a central processing unit (CPU) 141 for executing programmed logic (thereby forming programmed logic circuitry), a ROM 142 for storing control data and control programs such as programmed logic needed to form a cylinder pressure estimation unit 54, a RAM 143 for storing various data, a buffer memory 144, an input/output circuit 145 for communicating data signals from sensors, and a bus line 146. The CPU 141 of the ECU 40 executes, for example, the procedure of the programmed logic for a cylinder pressure estimation unit 54 shown in more detail by FIG. 2—thereby forming programmed logic circuitry. The ECU 40 controls the operation of a throttle 22 at the intake side of the engine. A manifold pressure sensor 24 in an intake manifold 32 provides control signals to the ECU 40. A fuel injector 28 for each cylinder is connected to a fuel supply line 27. In the present example the fuel injectors are represented as direct fuel injectors that inject fuel directly into each cylinder. A pressure regulator 30 is used to control fuel pressure from a fuel supply line 26 to the fuel supply line 27. The individual injectors 28 receive control signals from the ECU 40 to control the timed injection of fuel. Spark plugs 34 receive ignition timing (IGT) signals from the ECU 40.

The engine control unit 40 receives signals from a crank sensor 35 that indicates rotation of the crankshaft of the engine. The engine control unit 40 also receives signals from camshaft sensors 38 and 44 indicating the timing of the rotation of intake and exhaust camshafts 36 and 42, respectively. The intake and exhaust camshafts 36 and 42 respectively control intake and exhaust valves (not shown). The engine control unit receives other signals from other sensors (not shown) in a conventional manner such that the engine control unit is able to monitor operating parameters such as engine speed, engine load, etc. The engine control unit 40 also receives control signals from a universal heated exhaust gas oxygen (UHEGO) sensor 48 and a heated exhaust gas oxygen (HEGO) sensor 52. In the example shown the UHEGO sensor and the HEGO sensor are located either side of a catalytic converter 50, downstream of the exhaust manifold 46. However, in other examples the positioning of UHEGO sensor 48 and/or the HEGO sensor 52 could be different. The ECU 40 includes a cylinder pressure estimation unit 54 that is described in more detail with respect to FIGS. 2 to 4.

It should be noted that a four cylinder engine is illustrated in FIG. 1 for ease of explanation only, and that an example embodiment of the invention may include four or another number of cylinders. For example, the internal combustion engine could include 8 cylinders arranged in two banks of four cylinders. Accordingly, the view of the cylinder head of the bank of four cylinders may be as shown in FIG. 1 except that an intake manifold is provided for each bank, with each bank being connected to the throttle 22, and that an exhaust manifold is provided for each bank with each exhaust manifold either connected to respective exhaust systems or to a common exhaust system.

Figure 2:
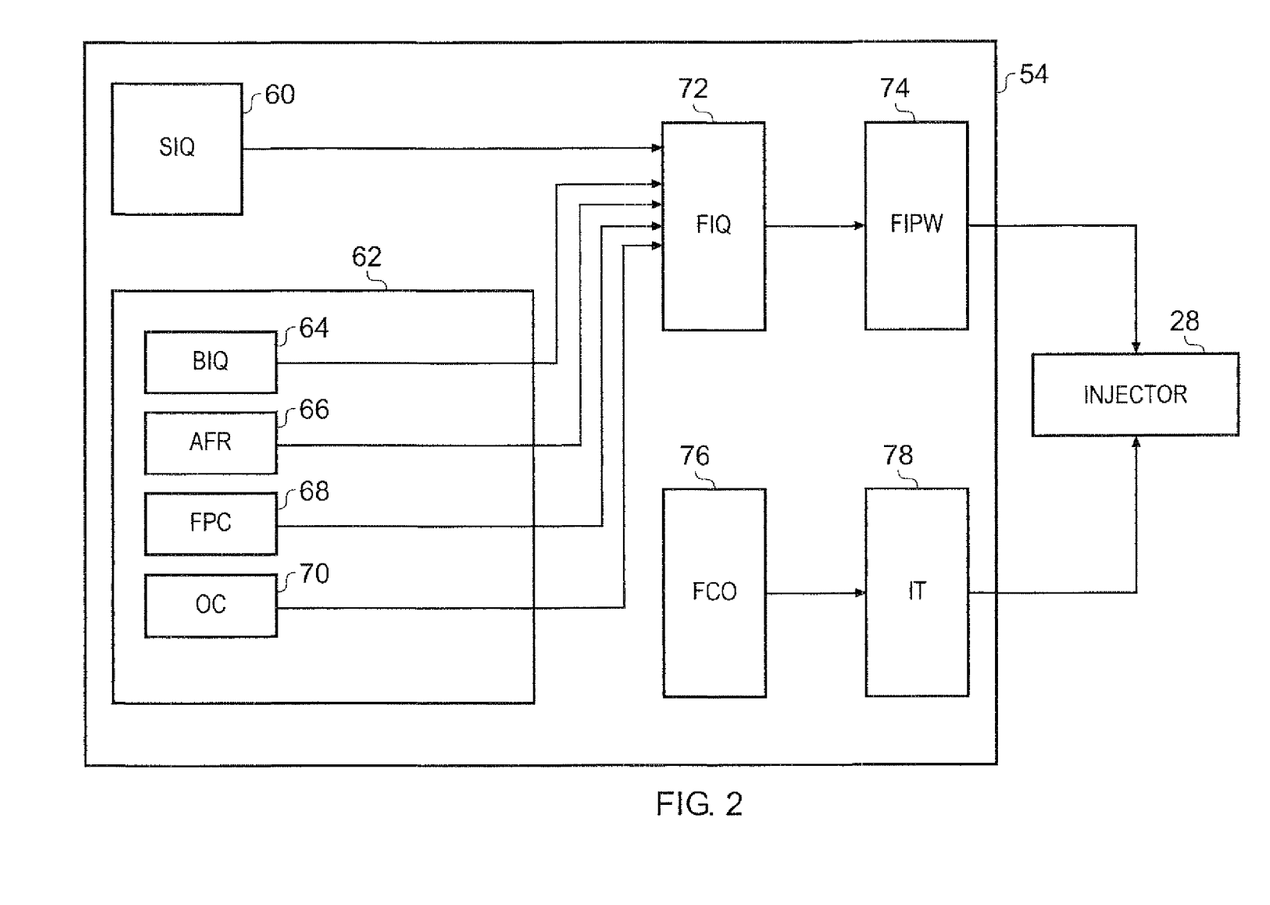
FIG. 2 is a block diagram of part of an example of an engine control unit according to an example embodiment of the invention.

FIG. 2 is a schematic block diagram representing an example of part of a cylinder pressure estimation unit 54. FIG. 2 illustrates an example, only, of various programmed logic blocks that can be executed by the CPU 141 of the ECU 40 and can be included in an example embodiment of a cylinder pressure estimation unit 54. These include various logical elements for determining an injection quantity and an injection pulse width for controlling the operation of an injector 28. It should be noted that although one injector 28 only is illustrated in FIG. 2 for convenience of illustration and explanation, respective signals can be provided to respective injectors in a multi-cylinder engine.

Start injection quantity (SIQ) logic 60 provides a start injection quantity value which can be used for an initial start injection amount. After-start injection quantity logic 62 is operable to compute injection quantities that are operable after an initial start phase.

The after-start injection quantity logic 62 can include various logical units including base injection quantity logic 64 that provides a base value of the injection quantity. Air-fuel ratio (AFR) logic provides AFR feedback control based on various measured parameters within the engine system. Fuel pressure compensation (FPC) logic 68 provides fuel pressure compensation as will be described in more detail with respect to FIGS. 3 and 4. Other compensation (OC) logic 70 can provide for further compensation factors, such as, for example, injector temperature compensation, purge control compensation, etc., depending on a particular implementation.

The various outputs of the logic unit of the start injection quantity logic 60 and the after-start injection quantity logic 62 are provided to final injection quantity logic 72. The final injection quantity logic generates a final injection quantity value as a function, for example a product, of signals output by the logic elements 60-62 described above. The final injection quantity value is provided to final injection pulse width logic 74 that outputs injector control signals to the injector 28 to provide signals for controlling the injector to provide the injector quantity based on the characteristics of the injector 28.

Also shown in FIG. 2 is fuel cut-off (FCO) control logic 76. The fuel cut-off control logic 76 can provide fuel cut-off signals in response to for example, an overrun situation, an overspeed situation, an ignition fail situation, an ignition brake situation, or a torque reduction situation. The fuel cut-off control logic 76 provides signals to an injection timing (IT) control logic 78 which in turn provides control signals to the injector 28 for cutting injection to respective cylinders in accordance with one or more predetermined fuel cut-off strategies in response to the output from the fuel cut-off control logic 76.

In the following, the cylinder pressure estimation will be described in more detail with reference to FIGS. 3 and 4.

Figure 3:
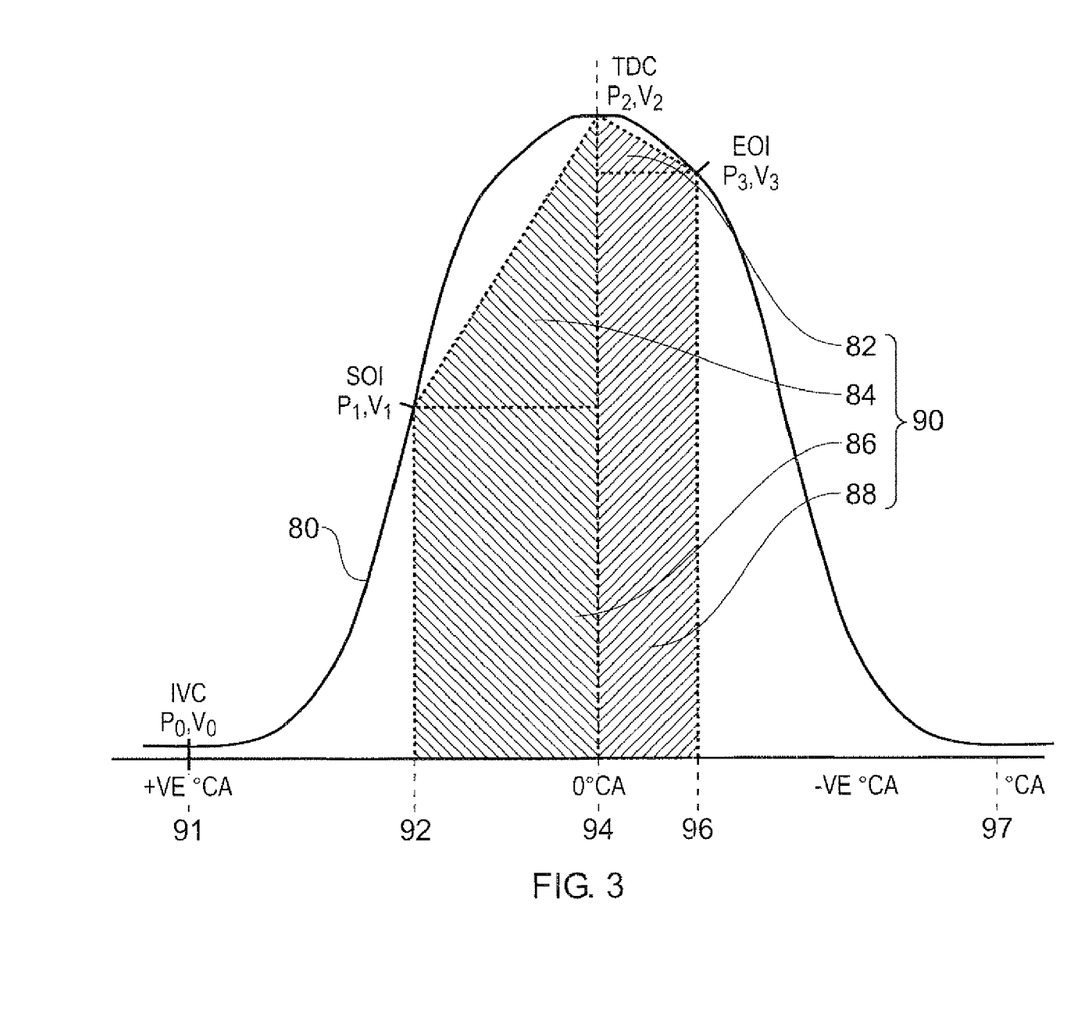
FIG. 3 is a diagram illustrating changing pressures over a non-firing cycle.

FIG. 3 is a schematic representation of pressure over time within a combustion chamber, for example the combustion chamber of an engine cylinder. The bold line 80 represents the cylinder pressure trace over time where time advances from left to right, with a positive crank angle (CA) corresponding to an intake valve closure (IVC) timing 91, a crank angle corresponding to a start of injection (SOI) timing 92, a zero crank angle corresponding to top dead center (TDC) timing 94, a further crank angle corresponding to an end of injection (EOI) timing 96 and a negative crank angle corresponding to the end of the cycle 97.

In operation of the engine, the top dead center point 94 is dictated by the movement of the piston within the cylinder. The IVC timing 91 and the end of cycle timing 97 are dependent on the valve timing. For example, in an engine with variable valve timing, the IVC timing 91 and the end of cycle timing 97 will vary dynamically according to the variable valve timing. The timing of the start of injection and end of injection at 92 and 96 will vary from cycle to cycle depending on the operational state of the engine, the amount of fuel injected, air pressure and various other factors (including the current state of the variable valve timing in an engine with variable valve timing).

FIG. 3 illustrates that, at the IVC timing 91, the pressure in the combustion chamber is $P_0$ and the volume of the combustion chamber is $V_0$. At the start of injection (SOI) timing 92 represented in FIG. 3, the pressure in the combustion chamber is $P_1$ and the volume of the combustion chamber at that time is $V_1$. At top dead center (TDC) timing 94, the pressure in the combustion chamber is $P_2$ and the volume of the combustion chamber at that time is $V_2$. At the end of injection (EOI) timing 96 shown in FIG. 3, the pressure is $P_3$ and the volume of the combustion chamber is $V_3$. It can be seen from the pressure trace 80 that the pressure within the combustion chamber varies between the start of injection timing 92 and the end of injection timing 96, whereby the pressure drop across the injector will vary during the time that the injector is open dependent on the pressure within the combustion chamber.

Accordingly, in order to accurately determine the injection pulse width, that is the period when the injector releases fuel into the combustion chamber, it is necessary to take account of the change in pressure within the combustion chamber. As noted above, various timings including the IVC timing 91, the SOI timing 92 and the EOI timing 96 will vary from engine cycle to engine cycle depending on the instant engine operating parameters.

Accordingly, one example embodiment of the present invention seeks to provide an approach to determining an average pressure within the combustion chamber using estimations of the pressures at the SOI timing 92, the TDC timing 94 and the EOI timing 96. As will become clear in the following, it is also possible that the end of injection will occur before top dead center, whereby in that instance, an estimation of the average pressure within the combustion chamber can be based on an estimate of the pressure at a crank angle corresponding to the start of injection and an estimation of the pressure at a crank angle corresponding to the end of injection.

An example embodiment of the invention estimates pressure in the cylinder based on calculations relating to the hatched areas, 82, 84, 86 and 88, which together form an estimation 90 of the pressure in the cylinder during compression injection. An example embodiment of the invention used the isentropic equation $PV^\gamma$=constant. This simple equation is deemed sufficient for approximation but accuracy could be improved by consideration of other factors such as the change in mass due to the added fuel, the enthalpy of evaporation (latent heat) of the fuel and the deviation of fuel/air mixture from ideal gas behavior.

It should be noted that the representation of the combustion cycle shown in FIG. 3 does not include the combustion event, it being assumed in the present example that the injection phase has finished before significant pressure rise due to combustion occurs.

Figure 4:
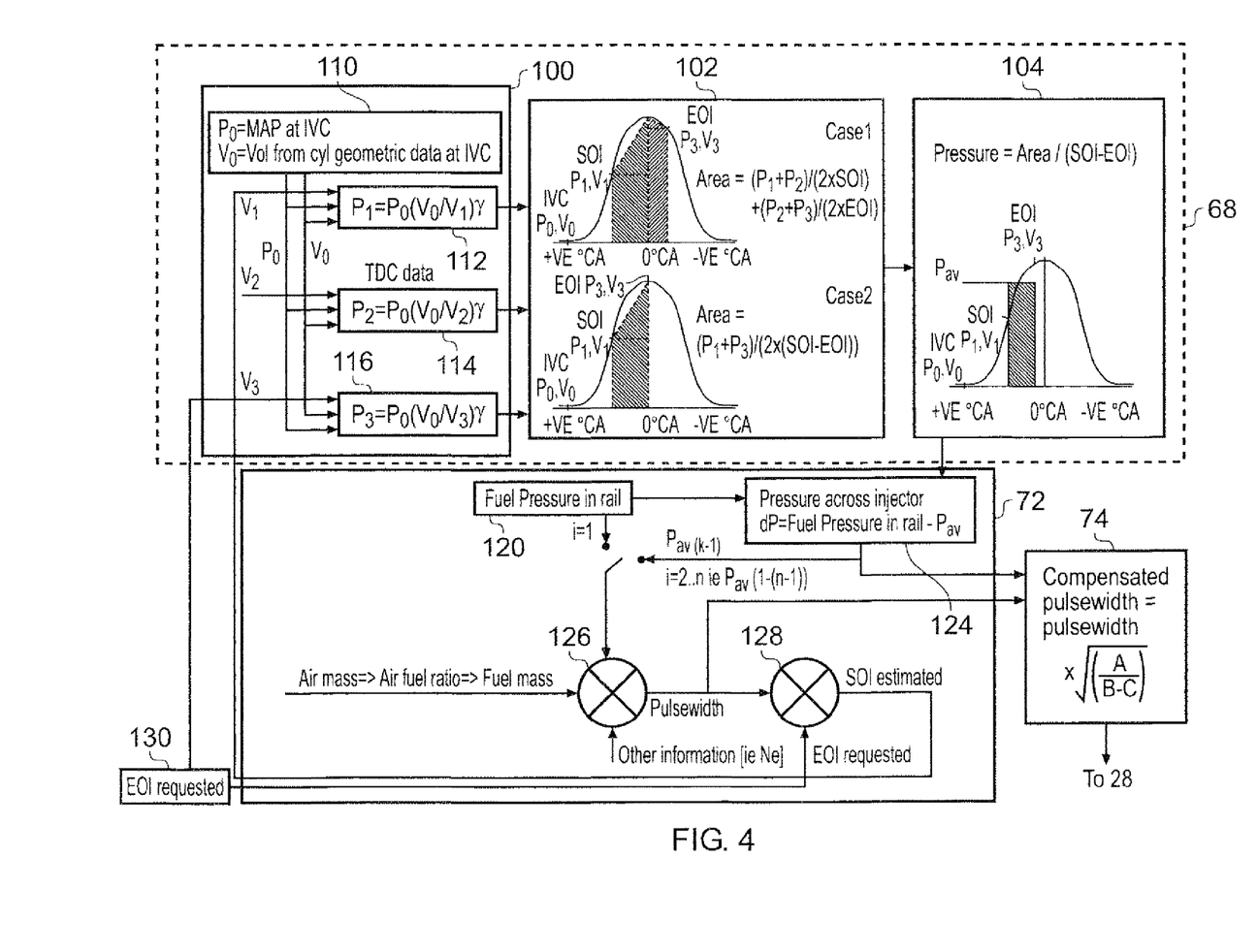
FIG. 4 is a block diagram illustrating parts of the engine control unit.

FIG. 4 illustrates various functional components of the FPC logic 68, the FIQ logic 72 and the FTPW logic 74 shown in FIG. 2. Each of the components can be executed by the CPU 141 of ECU 40.

The FPC logic 68 includes pressure estimation logic 100, area estimation logic 102 and average pressure estimation logic 104.

The area estimation logic 100 receives as input parameters a pressure $P_0$ from a manifold air pressure sensor at an IVC timing 91 as a first input value and a volume $V_0$ representative of the volume of the compression chamber at the IVC timing. The IVC timing 91 can be determined in accordance timing signals from the crank sensor 35 (with compensation dependent upon the current valve timing) and/or the intake cam sensor 38 by the ECU 40. The $P_0$ and $V_0$ parameters are provided as inputs to first pressure estimation logic 312, second pressure estimation logic 114 and third pressure estimation logic 116. The first estimation logic 112 receives as a further input a volume $V_1$ representative of the volume of the compression chamber at an estimated SOI timing 92 provided from the final input quantity logic 72. The second pressure estimation logic 114 receives as a further input a volume $V_2$ representative of a volume of the compression chamber at the TDC timing 94. The third pressure estimation logic 116 receives as a third input a volume $V_3$ representative of a volume of the compression chamber at an EOI timing 96 requested by the EOI request logic 130.

The various values for $V_0$, $V_1$, $V_2$ and $V_3$ can be derived from a map containing volume values accessed in response to the respective timing signals. In the present example, the injection timing pulse width uses the EOI timing as a reference point and then the SOI timing is computed to enable an appropriate pulse width. The EOI timing forms the reference timing as the timing of the end of injection needs to take account of the ignition timing, and need to ensure that fuel injection takes place in time to accumulate the required fuel charge prior to ignition.

The first pressure estimation logic 112 is operable to compute a first estimated pressure $P_1$ representative of a pressure at the estimated start of injection timing as a function of $P_0(V_0/V_1)^\gamma$. The second pressure estimation logic 114 is operable to compute an estimation of the pressure $P_2$ at top dead center as a function of $P_0(V_0/V_2)^\gamma$. The third pressure estimation logic 116 is operable to compute a first pressure estimation value representative of an estimated pressure at an end of injection timing as a function of $P_0(V_0/V_3)^\gamma$. The output of the first estimation logic 112, the second estimation logic 114 and the third estimation logic 116 is provided to area estimation logic 102.

The area estimation logic 102 is responsive to the received signals to compute one of two different area computations depending on whether the EOI timing is before or after the TDC timing. Case 1 as represented in FIG. 4 is where the TDC timing precedes the EOI timing, that is the end of injection is after top dead center. In this case, the area calculation is performed by computing:

$$(P_1+P_2)/(2\times SOI)+(P_2+P_3)/(2\times EOI).$$

Case 2 is where the EOI timing is before the TDC timing, whereby the area computation logic is operable to perform the area calculation by computing:

$$(P_1+P_3)/(2\times(SOI-EOI)).$$

It can be seen that the area calculation computes the overall area of the hatched areas shown in case 1 and case 2, respectively. The output of the area computation logic 102 is provided to the estimated average pressure computation logic 104 which generates an estimate of the average pressure by computing:

$$AREA/(SOI-EOI)$$

where "AREA" is the area computed by the area computation logic 102.

Although in FIG. 4 separate logical computation elements are shown, it will be appreciated that the logical computational elements shown at 100, 102 and 104 can be replaced wholly or in part by mapping logic whereby inputs to the mapping logic in the form of an IVC timing, an estimated SOI timing, and an EOI timing. The output from the mapping logic then corresponds to the output of the average estimated pressure computation logic 104 which is provided to the final injection pulse width logic 74.

As represented in FIG. 4, the final injection quantity logic 72 receives as input air mass, air fuel ratio and fuel mass parameters which, in combination with potential further values including a fuel pressure in the fuel rail 120 and other inputs (such as Ne), are used by computation logic 126 to generate a pulse width value. The generated pulse width value is provided to the final injection pulse width logic 74 so that a compensated pulse width value may be calculated. The final injection pulse width logic 74, upon execution by the CPU 141, outputs injector control signals, based on the calculated compensated pulse width value, to the injector 28 for controlling the injector 28 to provide the injector quantity.

The fuel pressure in rail value 120 is also provided to differential pressure logic 124 which calculates a pressure across the injector 28 using the estimated pressure value output by the logic 104. The differential pressure logic 124 is operable to compute pressure values for subsequent timings which are then provided to the pulse width computation logic 126 for computing subsequent pulse width values.

Start of injection logic 128 is responsive to the requested end of injection timing 130 and the pulse width values output by the pulse width computation logic 126 to generate an estimated start of injection timing which is provided to the pressure estimation logic 100. The pulse width value from the pulse width computation logic 126 and the differential pressure value (equals fuel pressure in rail minus the estimated average pressure) is provided to the final injection pulse width logic 74 which computes a compensated pulse width as a function of:

pulse width*√(A/(B−C))

where A is the reference pressure for the injector, B is the rail pressure for the fuel supply line and C is the in cylinder average pressure.

As indicated above, for convenience of illustration and explanation the generation of a pulse width signal for one injector is provided, although it will be appreciated that respective signals can be provided for each of multiple injectors in a multi-cylinder engine Accordingly, it can be seen that an example embodiment of the invention makes use of the physical law of PV=constant to predict a pressure based upon manifold pressure and the crank angle of the engine.

Figure 5:
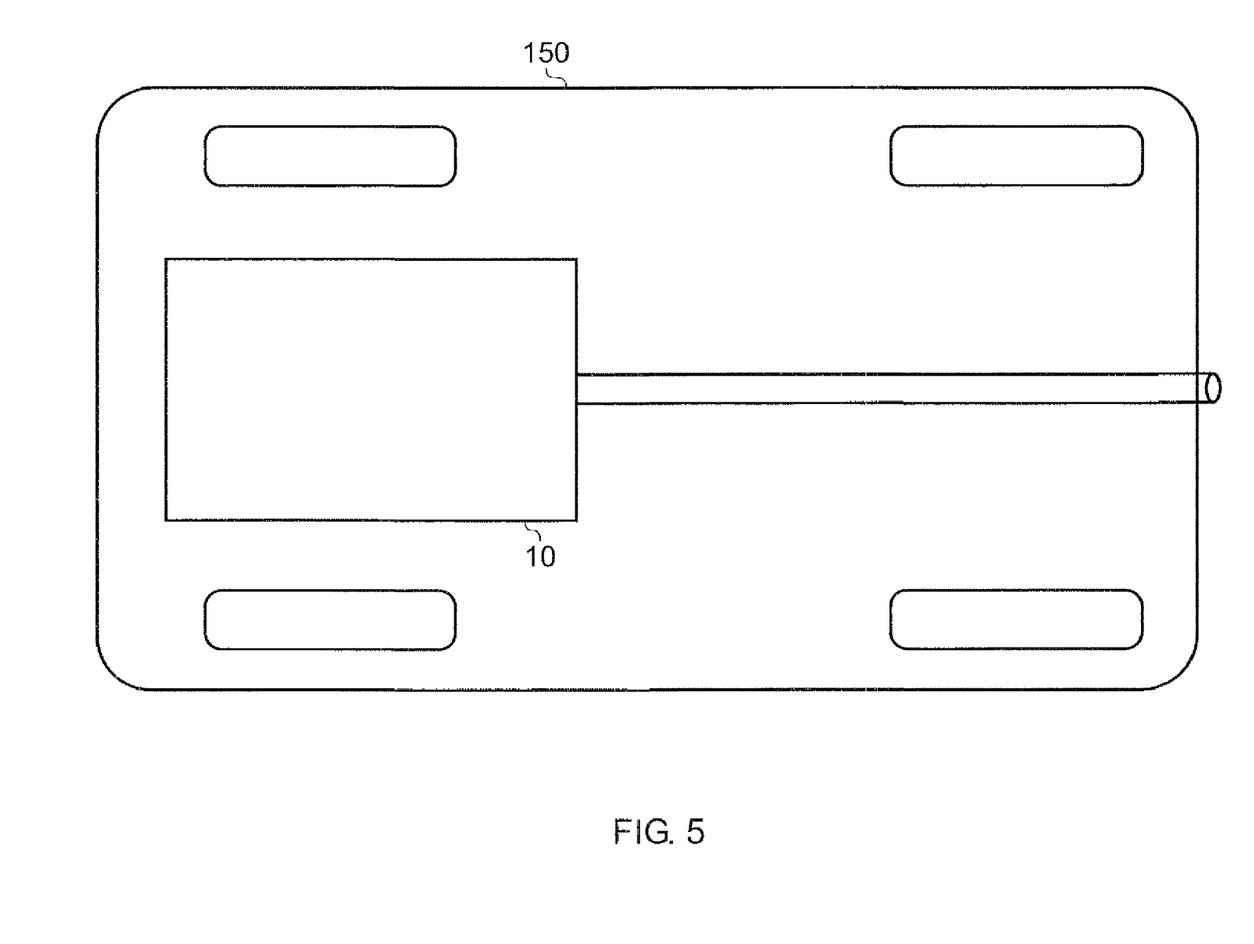
FIG. 5 is a schematic representation of a vehicle.

FIG. 5 is a schematic representation of a vehicle 150 including the engine system 10 described hereinabove.

An example embodiment of the present invention can use computer-readable program code executable by a CPU 141 of an engine control unit 40 and tangibly stored on a computer-readable storage medium (e.g., a ROM such as ROM 142 of ECU 40 or a RAM). The program code can be executable to estimate pressure in a combustion chamber of an internal combustion engine into which fuel is injected, wherein the pressure is estimated based on manifold pressure at a timing corresponding to intake valve closure and volumes of the combustion chamber at a timing corresponding to intake valve closure and at least one other timing.

Although the example embodiments above have been described in considerable detail, numerous variations and modifications will become apparent to those skilled in the art once the above disclosure is fully appreciated. It is intended that the following claims be interpreted to embrace all such variations and modifications as well as their equivalents. It should be understood that the foregoing drawings and detailed description are not intended to limit the invention to the particular form disclosed, but on the contrary, the invention is to cover all modifications, equivalents and alternatives falling within the spirit and scope of the present invention as defined by the appended claims.

What is claimed is:

1. A method of estimating, a pressure in a combustion chamber of an internal combustion engine into which fuel is injected by a fuel injector, the method comprising:
estimating the pressure based on manifold pressure at a timing corresponding to intake valve closure and volumes of the combustion chamber at a timing corresponding to intake valve closure and at least one other timing, and
estimating an average pressure $P_{av}$ in a combustion chamber of a cylinder of an internal combustion engine over a given period, and
predicting the pressure based on manifold pressure at the timing corresponding to intake valve closure and volumes of the combustion chamber at a timing corresponding to intake valve closure and at least two other timings.

2. The method of claim 1, wherein said estimating the pressure comprises computing at least one estimated pressure value $P_i = P_0(V_0/V_i)^\gamma$, where $P_i$ represents an estimated pressure in the combustion chamber at a given timing, $V_i$ represents the combustion chamber volume at the given timing, $P_0$ represents intake manifold pressure at the timing corresponding to intake valve closure and $V_0$ represents the combustion chamber volume at the timing corresponding to intake valve closure.

3. The method of claim 1, wherein said estimating the pressure comprises computing at least first and second estimated pressure values $P_i = P_0(V_0/V_i)^\gamma$ and $P_j = P_0(V_0/V_j)^\gamma$, where the first estimated pressure value $P_i$ represents an estimated pressure in the combustion chamber at a first given timing, $V_i$ represents the combustion chamber volume at the first given timing, the second estimated pressure value, $P_j$ represents an estimated pressure in the combustion chamber at a second given timing, $V_j$ represents the combustion chamber volume at the second given timing, $P_0$ represents intake manifold pressure at the timing corresponding to intake valve closure and $V_0$ represents the combustion chamber volume at the timing corresponding to intake valve closure.

4. The method of claim 3, further comprising determining an estimated average pressure $P_{av}$ by averaging the estimated pressures $P_i$ and $P_j$.

5. The method of claim 4, wherein the first estimated pressure $P_i$ represents an estimated pressure in the combustion chamber at a timing corresponding to a start of injection, $V_i$ represents the combustion chamber volume at the timing corresponding to the start of injection and the second estimated pressure value $P_j$ represents an estimated pressure in the combustion chamber at a timing corresponding to an end of injection prior to top dead center, $V_j$ represents the combustion chamber volume at the timing corresponding to the end of injection prior to top dead center, $P_0$ represents intake manifold pressure at the timing corresponding to intake valve closure and $V_0$ represents the combustion chamber volume at the timing corresponding to intake valve closure.

6. The method of claim 1, further comprising:
estimating an average pressure $P_{av}$ in a combustion chamber of a cylinder of an internal combustion engine over a period the injector is open, and
predicting the pressure based on manifold pressure at a timing corresponding to intake valve closure and volumes of the combustion chamber at a timing corresponding to intake valve closure and at least three other timings.

7. The method of claim 6, wherein said estimating the pressure comprises computing a first estimated pressure value $P_1 = P_0(V_0/V_1)^\gamma$, a second estimated pressure value $P_2 = P_0(V_0/V_2)^\gamma$ and a third estimated pressure value $P_3 = P_0(V_0/V_3)^\gamma$, where the first estimated pressure value $P_1$ represents an estimated pressure in the combustion chamber at a timing corresponding to a start of injection, $V_1$ represents the combustion chamber volume at the timing corresponding to the start of injection, the second estimated pressure value $P_2$ represents an estimated pressure in the combustion chamber at a timing corresponding to top dead center, $V_2$ represents the combustion chamber volume at the timing corresponding to top dead center, the third estimated pressure value $P_3$ represents an estimated pressure in the combustion chamber at a timing corresponding to end of injection after top dead center, $V_3$ represents the combustion chamber volume at the timing corresponding to end of injection after top dead center, $P_0$ represents intake manifold pressure at the timing corresponding to intake valve closure and $V_0$ represents the combustion chamber volume at the timing corresponding to intake valve closure.

8. The method of claim 7 further comprising:
estimating an average pressure $P_{av}$ in a combustion chamber of a cylinder of an internal combustion engine over the period the injector is open, and
averaging the estimated pressures $P_1$, $P_2$ and $P_3$ over the periods between start of injection, top dead center and end of injection, respectively.

9. A method of adjusting an injection pulse width during which a fuel injector is open for injecting fuel to a combustion chamber of an internal combustion engine, the method comprising:
applying a pressure compensation to a fuel supply pressure based on an estimated combustion chamber pressure, the estimated combustion chamber pressure being computed based on a manifold pressure at a timing corresponding to intake valve closure and volumes of the combustion chamber at a timing corresponding to intake valve closure and at least one other timing, and
computing at least first and second estimated pressure values $P_i = P_0(V_0/V_i)^\gamma$ and $P_j = P_0(V_0/V_j)^\gamma$, wherein the first estimated pressure $P_1$ represents an estimated pressure in the combustion chamber at a timing corresponding to a start of injection, $V_1$ represents the combustion chamber volume at the timing corresponding to the start of injection and the second estimated pressure value $P_2$ represents an estimated pressure in the combustion chamber at a timing corresponding to an end of injection prior to top dead center, $V_2$ represents the combustion chamber volume at the timing corresponding to the end of injection prior to top dead center, $P_0$ represents intake manifold pressure at the timing corresponding to intake valve closure and $V_0$ represents the combustion chamber volume at the timing corresponding to intake valve closure; and
computing the estimated combustion chamber pressure over the period the injector is open by averaging the estimated pressures $P_1$ and $P_2$.

10. The method of claim 9, wherein at least one estimated pressure value $P_i = P_0(V_0/V_i)^\gamma$ is computed, where $P_i$ represents an estimated pressure in the combustion chamber at a given timing, $V_i$ represents the combustion chamber volume at the given timing, $P_0$ represents intake manifold pressure at the timing corresponding to intake valve closure and $V_0$ represents the combustion chamber volume at the timing corresponding to intake valve closure.

11. A method of adjusting injection pulse width during which a fuel injector is open for injecting fuel to a combustion chamber of an internal combustion engine, the method comprising:
applying a pressure compensation to a fuel supply pressure based on an estimated combustion chamber pressure, the estimated combustion chamber pressure being computed based on a manifold pressure at a timing corresponding to intake valve closure and volumes of the combustion chamber at a timing corresponding to intake valve closure and at least one other timing, and
computing a first estimated pressure value $P_1 = P_0(V_0/V_1)^\gamma$, a second estimated pressure value $P_2 = P_0(V_0/V_2)^\gamma$ and a third estimated pressure value $P_3 = P_0(V_0/V_3)^\gamma$, where the first estimated pressure value $P_1$ represents an estimated pressure in the combustion chamber at a timing corresponding to a start of injection, $V_1$ represents the combustion chamber volume at the timing corresponding to the start of injection, the second estimated pressure value $P_2$ represents an estimated pressure in the combustion chamber at a timing corresponding to top dead center, $V_2$ represents the combustion chamber volume at the timing corresponding to top dead center, the third estimated pressure value $P_3$ represents an estimated pressure in the combustion chamber at a timing corresponding to an end of injection after top dead center, $V_3$ represents the combustion chamber volume at the timing corresponding to the end of injection after top dead center, $P_0$ represents intake manifold pressure at the timing corresponding to intake valve closure and $V_0$ represents the combustion chamber volume at the timing corresponding to intake valve closure; and
computing the estimated combustion chamber pressure over the period the injector is open by averaging the estimated pressures $P_1$, $P_2$ and $P_3$ over the periods between start of injection, top dead center and end of injection, respectively.

12. A method of adjusting an injetion pulse width during which a fuel injector is open for injecting fuel to a combustion chamber of an internal combustion engine, the method comprising:
applying a pressure compensation to a fuel supply pressure based on an estimated combustion chamber pressure, the estimated combustion chamber pressure being computed based on a manifold pressure at a timing corresponding to intake valve closure and volumes of the combustion chamber at a timing corresponding to intake valve closure and at least one other timing,
wherein a pressure compensation applied to a fuel supply pressure for a given combustion cycle is based on a combustion chamber pressure over the period the injector is open based on an estimated combustion chamber pressure computation based on a previous combustion cycle.

13. An engine control unit comprising a processor which executes pressure estimating logic to estimate pressure in a combustion chamber of a cylinder of an internal combustion engine into which fuel is injected, including estimating the pressure based on manifold pressure at a timing corresponding to intake valve closure and volumes of the combustion chamber at a timing corresponding to intake valve closure and at least one other timing,
wherein the pressure estimation logic, upon execution by the processor, is operable:
to compute at least first and second estimated pressure values $P_i = P_0(V_0/V_i)^\gamma$ and $P_j = P_0(V_0/V_j)^\gamma$, wherein the first estimated pressure $P_i$ represents an estimated pressure in the combustion chamber at a timing corresponding to a start of injection, $V_i$ represents the combustion chamber volume at the timing corresponding to the start of injection and the second estimated pressure value $P_j$ represents an estimated pressure in the combustion chamber at a timing corresponding to an end of injection prior to top dead center, $V_j$ represents the combustion chamber volume at the timing corresponding to the end of injection prior to top dead center, $P_0$ represents intake manifold pressure at the timing corresponding to intake valve closure and $V_0$ represents the combustion chamber volume at the timing corresponding to intake valve closure; and to compute the estimated combustion chamber pressure over the period the injector is open by averaging the estimated $P_i$ and $P_j$.

14. The engine control unit of claim 13, wherein the pressure estimation logic, upon execution by the processor, is operable to compute at least one estimated pressure value $P_i = P_0(V_0/V_1)^\gamma$, where $P_i$ represents an estimated pressure in the combustion chamber at a given timing, $V_i$ represents the combustion chamber volume at the given timing, $P_0$ represents intake manifold pressure at the timing corresponding to intake valve closure and $V_0$ represents the combustion chamber volume at the timing corresponding to intake valve closure.

15. An engine control unit comprising a processor which executes pressure estimating logic to estimate pressure in a combustion chamber of a cylinder of an internal combustion engine into which fuel is injected, including estimating the pressure based on manifold pressure at a timing corresponding to intake valve closure and volumes of the combustion chamber at a timing corresponding to intake valve closure and at least one other timing, wherein the pressure estimation logic, upon execution by the processor, is operable:

to compute a first estimated pressure value $P_1 = P_0(V_0/V_1)^\gamma$, a second estimated pressure value $P_2 = P_0(V_0/V_2)^\gamma$ and a third estimated pressure value $P_3 = P_0(V_0/V_3)^\gamma$, where the first estimated pressure value $P_1$ represents an estimated pressure in the combustion chamber at a timing corresponding to a start of injection, $V_1$ represents the combustion chamber volume at the timing corresponding to the start of injection, the second estimated pressure value $P_2$ represents an estimated pressure in the combustion chamber at a timing corresponding to top dead center, $V_2$ represents the combustion chamber volume at the timing corresponding to top dead center, the third estimated pressure value $P_3$ represents an estimated pressure in the combustion chamber at a timing corresponding to an end of injection after top dead center, $V_3$ represents the combustion chamber volume at the timing corresponding to the end of injection after top dead center, $P_0$ represents intake manifold pressure at the timing corresponding to intake valve closure and $V_0$ represents the combustion chamber volume at the timing corresponding to intake valve closure; and to compute the estimated combustion chamber pressure over the period the injector is open by averaging the estimated pressures $P_1$, $P_2$ and $P_3$ over the periods between start of injection, top dead center and end of injection, respectively.

16. An engine control unit comprising a processor which executes pressure estimating logic to estimate pressure in a combustion chamber of a cylinder of an internal combustion engine into which fuel is injected, including estimating the pressure based on manifold pressure at a timing corresponding to intake valve closure and volumes of the combustion chamber at a timing corresponding to intake valve closure and at least one other timing, and injection pulse width adjustment logic coupled to the pressure estimation logic, the injection pulse width adjustment logic, upon execution by the processor, being operable to adjust a period during which a fuel injector is open for injecting fuel to an internal combustion engine and to compute the injection pulse width adjustment by applying a pressure compensation to a fuel supply pressure based on an estimated combustion chamber pressure computed by the pressure estimation logic.

17. The engine control unit of claim 16, wherein the injection pulse width adjustment logic, upon execution by the processor, is operable to compute the injection pulse width adjustment by applying a pressure compensation to a fuel supply pressure for a given combustion cycle based on an estimated combustion chamber pressure computation for a previous combustion cycle.

* * * * *